3,470,171
OXAZINOISOQUINOLINE DERIVATIVES
Frank H. Clarke, Jr., Armonk, N.Y., assignor to Geigy Chemical Corporation, Ardsley, N.Y., a corporation of New York
No Drawing. Continuation-in-part of application Ser. No. 634,856, May 1, 1967. This application Apr. 26, 1968, Ser. No. 724,622
Int. Cl. C07d *87/50, 35/24;* A61k *27/00*
U.S. Cl. 260—244          21 Claims

ABSTRACT OF THE DISCLOSURE 3-carboxamido, and substituted carboxamido, derivatives of 9,10-dialkoxy-, 9,10,11-trialkoxy- and 9,10-methylenedioxy - 1,3,4,6,7,11b - hexahydro-[1,4]oxazino[3,4a]isoquinolines, and their salts, possess tranquilizing and muscle relaxant properties. They can be prepared through treatment of derivatives of the corresponding 3-carboxylic acid with an amine. Typical embodiments are 3 - carboxamido-9,10-dimethoxy-1,3,4,6,7,11b-hexahydro-[1,4]oxazino[3,4a]isoquinoline and 3-(N,N-diethylcarboxamido) - 9,10 - dimethoxy - 1,3,4,6,7,11b-hexahydro-[1,4]-oxazino[3,4a]isoquinoline.

CROSS REFERENCE

This is a continuation-in-part of copending application Ser. No. 634,856, filed May 1, 1967.

DETAILED DESCRIPTION

The present invention pertains to novel derivatives of [1,4]oxazino[3,4]isoquinolines, to methods for their preparation and use, and to intermediates useful in their preparation.

In particular, the present invention pertains to processes for the preparation of compounds, and to the compounds themselves, of the formula:

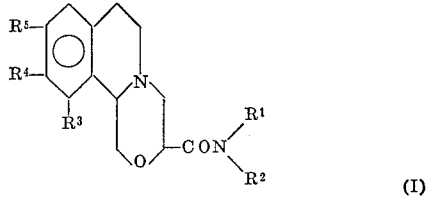

wherein each of $R^1$ and $R^2$ taken independently is hydrogen or (lower)alkyl and $R^1$ and $R^2$ taken together with the nitrogen atom to which they are attached are morpholino, piperidino, pyrrolidino, piperazino, N'-[(lower)alkyl]piperazino, N' - [hydroxy(lower)alkyl]piperazino, or N'-[(lower)alkoxy(lower)-alkyl]piperazino; $R^3$ is hydrogen or (lower)alkoxy; and each of $R^4$ and $R^5$ taken independently is (lower)alkoxy or $R^4$ and $R^5$ taken together when $R^3$ is hydrogen are methylenedioxy; and the pharmaceutically acceptable acid addition salts thereof with organic and inorganic acids.

By the term "(lower)alkyl" and derivations thereof utilizing the root "alk," such as "(lower)alkoxy," "(lower)-alkanoyloxy," and the like, is intended, unless otherwise qualified, a group comprising a branched or straight hydrocarbon chain containing from one to six carbon atoms. Representative of (lower)alkyl groups are thus methyl, ethyl, propyl, i-propyl, butyl, s-butyl, t-butyl, pentyl, iso-pentyl, hexyl and the like. Embraced by lower alkoxy are groups containing from one to six carbon atoms and joined through an oxygen ether bond, such as methoxy, ethoxy, i-propoxy, butoxy and the like. It is to be understood that when the nature of any particular functional group in these moieties requires two carbon atoms, the hydrocarbon portion of the moiety will have from two to seven carbon atoms. Thus "(lower)alkanoyloxy" is typified by acetoxy, propanoyloxy, butanoyloxy, pentanoyloxy, hexanoyloxy and the like.

With greater particularity to Formula I, the compounds of the present invention are named in accordance with the conventions of Chemical Abstracts as derivatives of [1,4]-oxazino[3,4a]isoquinoline, the nucleus of which is represented and numbered as follows:

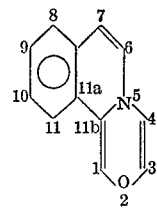

(II)

The novel compounds of the present invention are thus derivatives of 1,3,4,6,7,11b-hexahydro-[1,4]oxazino[3,4a]isoquinolines.

The compounds of the present invention are either unsubstituted or substituted by a (lower)alkoxy group, preferably methoxy, in the 11 position and substituted by (lower)alkoxy groups, preferably methoxy, in the 9 and 10 positions. Alternatively when unsubstituted in the 11 position, there can be a methylenedioxy group bridging the 9 and 10 positions. Preferred species are those which are disubstituted by methoxy in the 9 and 10 positions.

A carboxamido group is in the 3-position of the compounds of the present invention. The amido group may be unsubstituted [$R^1$ and $R^2$=hydrogen], monosubstituted by a (lower)alkyl group [$R^1$=hydrogen, $R^2$=(lower)alkyl], disubstituted by (lower)alkyl [$R^1$=(lower)alkyl, $R^2$=(lower)alkyl], or disubstituted by a cyclic structure so that, together with the nitrogen atom, a heterocyclic group such as morpholino, piperazino, piperidino, pyrrolidino or the like is present.

The 3 - carboxamido - 1,3,4,6,7,11b - hexahydro-[1,4]-oxazino[3,4a]isoquinolines of the present invention, namely those of Formula I, possess tranquilizing and muscle relaxing properties. They are accordingly useful in combatting agitation and hyperactivity in animals, in pre-operative treatment and in the treatment of anxiety, tension and apprehension occurring alone or in association with various physiological disorders. These compounds advantageously have a high therapeutic index and do not appear to deplete norepinephrine at normal dosage levels. Generally the compounds are administered at levels of from about 5 to about 75 mg./kg. of body weight although as with any agent of this type, the dose will vary depending upon the patient and condition.

The tranquilizing and muscle relaxant properties of these compounds can be conveniently observed in a variety of standard tests which are correlated pharmacologically with specific therapeutic responses. For example, tranquilizing action is observed in the Mouse Reflex Test in which for these compounds the ratios of the dose required to effect prehensile reflex blocking to the dose required to effect traction blocking are greater than 3. In the chloralose anesthetized cat with spinal column severed at the first cervical vertebra, depression of the polysynaptic reflexes (linguo-mandibular and flexor) upon electric stimulation is observed for at least four hours at a dose of 20 mg./kg. i.e., a pattern characteristic of a central muscle relaxant. A typical neuroleptic response is observed in the Sidman Avoidance Test in gerbils. In the wild red fox, the compounds are qualitatively similar to chlordiazepoxide. In the monkey they cause reduced activity and friendly behavior without ataxia.

These compounds can be administered parenterally or orally, preferably the latter, in any of the usual pharmaceutical forms including tablets, capsules, powders, suspensions, solutions, syrups and the like, including sustained release preparations which may be compounded by any of the known procedures. The compounds of the present invention are incorporated in compositions suitable for oral administration in solid and liquid unit dosage forms, standard modes of administration being employed. The term unit dosage form as used in this specification and claims refers to physically discrete units suitable as unitary dosages for animals, each unit containing a predetermined quantity of active material calculated to produce the desired therapeutic effect in association with the required pharamceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such a syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carnauba wax may be provided. Dyestuffs can be added to these coatings to distinguish different unit dosages.

For parenteral administration, fluid unit dosage forms can be prepared by suspending or dissolving a measured amount of the compound in a non-toxic liquid vehicle suitable for injection.

One important embodiment of the present invention is the acid addition salts of the compounds of Formula I which are derived from phamaceutically acceptable non-toxic acids. Such pharmaceutically acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tararic, embonic and like acids.

The presence of asymmetric substitution on the 3- and 11b-carbon atomcs permits the existince of four isomeric forms. These correspond to the two enantiomorphs of the stereoisomer wherein the hydrogen atoms in positions 3and 11b are in the cis relationship and the two enantiomorphs of the stereoisomer wherein these hydrogen atoms are in the trans relationship. Two such stereosiomeric racemates have been obtained and arbitrarily designated isomer I and isomer II, it being believed on the basis of present studies that isomer I corresponds to cis and isomer II corresponds to trans. Isomer I can be rearranged to the more stable isomer II through the action of strong base. The two pairs of enantiomorphs, i.e., the mixture of racemic isomer I and racemic isomer II, are separable into the individual racemates through fractional crystallization, chromatography or the like by reason of their different physical properties while the individual enantiomorphs of each pair are separated through the use of optically active acids according to conventional techniques. All such isomeric forms are within the purview of the present invention.

According to the process of the present invention, a compound of the formula:

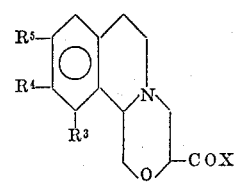

(III)

in which X is chloro, bromo, (lower)alkoxy, cyanomethyl, p-nitrophenoxy, (lower)alkoxycarbonyloxy or benzyloxycarbonyloxy and $R^3$, $R^4$ and $R^5$ is as defined above, is treated with an amine of the formula:

in which $R^1$ and $R^2$ is as defined above, except that when the amine is piperazine, one of the nitrogens thereof bears a protecting group, such as a carbobenzoxy group, which is subsequently removed as through the action of hydrogen bromide in glacial acetic acid. Furthermore in those instances in which X is chloro or bromo, the reaction is performed in the presence of an acid binding agent.

An alkali metal salt of the amine, such as the lithium amide, may be alternatively employed in place of the amine.

The reaction of the carboxylic acid derivatives of Formula III and the above amines can be performed at room temperature or at slightly elevated temperature. When the reaction is strongly exothermic, it can be attenuated by means of external cooling. An inert solvent can be advantageously employed, particularly for those derivatives in which X is chloro or bromo, in which case the solvent should also be non-aqueous. Suitable inert solvents include hydrocarbons, particularly mononuclear aromatic hydrocarbons such as benzene, toluene and xylene: chlorinated lower alkanes, such as 1,2-dichloroethane and the trichloroethanes; or hydrocarbon ethers such as 1,2-dimethoxyethane or 1,2-diethoxyethane. Similar inert organic solvent can be employed for those compounds of Formula III wherein X is cyanomethoxy, p-nitrophenoxy, (lower)alkoxycarbonyloxy or benzyloxycarbonyloxy. When X is (lower)alkoxy, aqueous or non-aqueous (lower)alkanols can also be employed.

The compounds of Formula III can be prepared from the corresponding free carboxylic acid or in the case of those compounds wherein X is alkoxy, from the nitrile. Thus 3-cyano1,3,4,6,7,11b-hexahydro-[1,4]oxazino[3,4a] isoquinolines of Formula IV are hydrolysed with base such as potassium or sodium hydroxide to the corresponding carboxylic acids or salts thereof of Formula V:

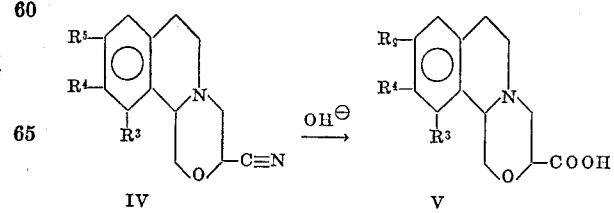

IV          V

The acids of Formula V can be esterified employing conventional techniques to yield the 3-carbalkoxy compounds of Formula III [X = (lower)alkoxy] or converted to the acid halides of Formula III [X = chloro or bromo] as with oxalyl chloride, thionyl chloride or the like. Alternatively the nitriles of Formula IV are converted directly to the corresponding esters through treatment with a (lower)alkanol in the presence of an acid and water.

Those compounds of Formula III wherein X is cyanomethoxy or p-nitrophenoxy are obtained from the carboxylic acid of Formula V through the action of chloroacetonitrile and an acid binding agent such as triethylamine, in the case of the cyanomethyl ester, and through the action of p-nitrophenol a trifluoroacetate, in the case of the p-nitrophenyl ester.

Those compounds of Formula III wherein X is (lower)alkoxycarbonyloxy or benzyloxycarbonyloxy are similarly prepared from the carboxylic acid of Formula V through the action of a (lower)alkyl chloroformate or benzyl chloroformate in the presence of an acid binding agent such as triethylamine. The resulting mixed anhydride need not be isolated but is allowed to react in situ with the appropriate amine, as described above.

The 3-cyano compounds of Formula IV are prepared through Lewis acid cyclization of a 2-cyano or 2-carboxamide-4-phenethylmorpholin-5-one of Formula VI and reduction of the intermediate product, either chemically with complex hydrides such as sodium borohydride or catalytically as with palladium on carbon. These reactions may be represented as follows:

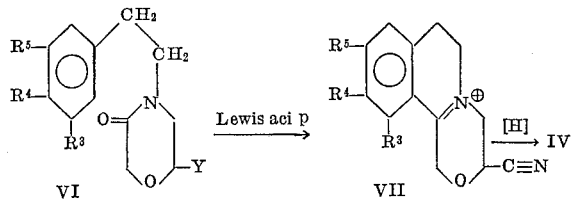

In the above, Y is cyano or carboxamido and $R^3$, $R^4$ and $R^5$ are as defined above. In the above transformation of VI and VII suitable Lewis acids include polyphosphoric acid, phosphorus trichloride, phosphorus tribromide, phosphorus pentachloride, phosphorus oxychloride, borontrifluoride etherate, aluminum chloride, stannic chloride and the like, particularly phosphorus oxychloride, phosphorus trichloride and polyphosphoric acid. Suitable solvents for this cyclization include halogenated (lower)-alkanes such as 1,2-dichloroethane, trichloroethanes, trichloropropanes and the like. Starting materials of Formula VI bearing an unsubstituted carboxamido group in the 2-position, under the preferred conditions of the cyclization, generally undergo acid catalysed dehydration and the product is thus the 3-cyano compound of Formula VII.

The 4-phenethylmorpholin-5-ones of Formula VI are prepared through condensation of an appropriately substituted phenethylamine and an epoxide of acrylonitrile or of acrylamide and treatment of the resulting 2-hydroxy-3-phenethylamino-propiontrile or -propionamide, respectively, with sodium hydride and ethyl chloroacetate. These reactions may be represented as follows:

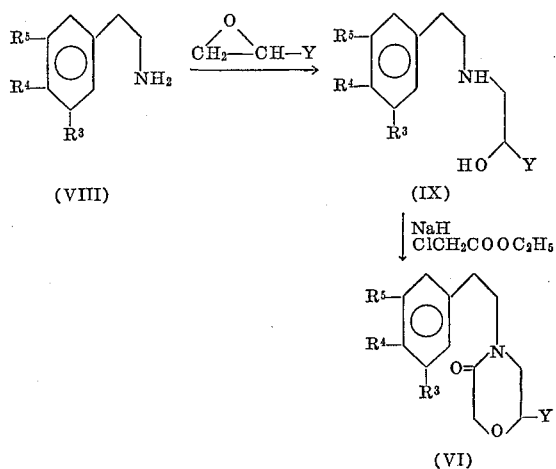

In the foregoing $R^3$, $R^4$, $R^5$ and Y are previously defined.

As a second process for the preparation of certain compounds of the present invention of Formula I, a 2-(N,N-disubstituted carboxamido) 4-phenethylmorpholin-5-one of Formula X is cyclized with a Lewis acid, optionally in an inert solvent, and the intermediate product then reduced:

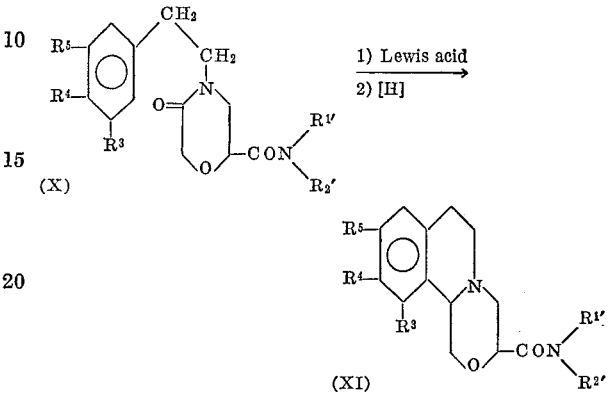

In the foregoing, $R^3$, $R^4$ and $R^5$ are as defined above and each of $R^{1'}$ and $R^{2'}$ taken independently is (lower)alkyl or $R^{1'}$ or $R^{2'}$ taken together with the nitrogen to which they are attached are morpholino, piperidino, pyrrolidino or N'-[(lower) alkyl]-piperazino. The reaction conditions of the cyclization and reduction are completely analogous to those described above in the conversion of VI to VII to IV. Particularly preferred in the cyclization is the use of phosphorus oxychloride and 1,2-dichloroethane. The requisite starting materials are also obtained in an analogous fashion from the appropriate phenethylamine of Formula VIII and an epoxide of a N,N-disubstituted acrylamide.

The compounds of Formula I wherein each of $R^1$ and $R^2$ is hydrogen can also be obtained through hydrolysis of the 3-cyano compounds of Formula IV. This hydrolysis is performed with base, preferably an alkali metal hydroxide or alkali metal alkoxide in a (lower)alkanol, or with an acid such as hydrogen chloride in a (lower)alkanol.

Suitable alkali metal hydroxides include sodium and potassium hydroxide in a (lower)alkanol such as ethanol. Sodium or potassium lower alkoxides such as, for example, sodium ethoxide or potassium t-butoxide, can also be used, the alkoxide being employed in the corresponding (lower)alkanol as solvent.

Following preparation of the free bases of Formula I by any of the above procedures, conversion to corresponding acid addition salts can be accomplished according to conventional techniques, as described above.

The following examples will serve to further typify the nature of the present invention but should not be construed as a limitation on the scope thereof.

EXAMPLE 1

3-cyano-9,10-dimethoxy-1,3,4,6,7,11b-hexahydro-[1,4]oxazino[3,4a]isoquinoline (A) To a solution of 30.93 g. (0.3 mole) of benzonitrile in 150 ml. of methanol are added with stirring 17.7 g. of acrylamide. Upon complete dissolution there are sequentially added 30 ml. (0.3 mole) of 30% aqueous hydrogen peroxide, 5 ml. of 0.1 M aqueous disodium hydrogen phosphate and 5 ml. of 0.5 N aqueous sodium hydroxide. The solution's temperature is maintained at about 40° C. through cooling and an additional 20 ml. of 0.5 N aqueous sodium hydroxide are added in 5 ml. portions every 30 minutes. The mixture is then stirred for an additional 30 minutes (total reaction time—2½ hours), evaporated in vacuo to remove the methanol, diluted with 100 ml. of water, and filtered. The solid thus collected is washed with a little water and the combined filtrate and washings are evaporated in vacuo. The oily residue is taken up in 100 ml. of acetone and this solution is dried over magnesium sulfate, filtered and evaporated in vacuo to give a pale yellow oil comprising glycidamide which is dissolved in 40 ml. of 1,2-dimethoxyethane and used immediately in the following procedures without further purification.

(B) To 39 ml. of the above solution of glycidamide in a cooling bath is added a molar equivalent amount of an approximately 2 molar solution of 2-(3,4-dimethoxyphenyl)-ethylamine in 1,2-dimethoxyethane. (The molar amount of glycidamide is determined by treatment of a 1 ml. aliquot of the 1,2-dimethoxyethane solution with 50 ml. of standardized 0.1 N hydrochloric acid in saturated aqueous magnesium chloride and titration, after a 30 minute reaction period, of the amount of hydrochloric acid consumed with 0.100 aqueous sodium hydroxide to methyl red indicator). The solid which forms is slurried with ether, collected by filtration, washed with ether and dried to yield a 2-hydroxy-3-[2-(3,4-dimethoxyphenyl)ethylamino]propionamide, which may be used in the following procedure without further purification. A pure sample obtained through recrystallization from methanol demonstrates a melting point of 123–128° C.

(C) To 35 ml. of a 1:1 mixture of benzene and dimethylformamide, previously dried through removal by distillation of about 10 ml., is added at room temperature 1.4 g. (0.034 mole) of a 60% dispersion of sodium hydride in mineral oil. Seven grams (0.026 mole) of 2-hydroxy - 3 - [2 - (3,4 - dimethoxyphenyl)ethylamino] propionamide are then added. The mixture is stirred for ten minutes, during which time the evolution of hydrogen may occur, cooled, treated with 2.8 ml. (0.03 mole) of ethyl chloroacetate. After stirring for 15 minutes with gentle heating as necessary, this reaction mixture is diluted with 100 ml. of dry benzene and heated at reflux under anhydrous conditions for 21 hours. The solvents are then removed in vacuo and the residue is triturated with acetone. After standing for 16 hours at room temperature, the mixture is filtered and the solid thus collected is washed with a little acetone and dried in vacuo to yield 2-carboxamido-4-[2-(3,4-dimethoxyphenyl)ethyl]morpholin-5-one, M.P. 159–164° C. Upon recrystallization from acetone, the material demonstrates a melting point of 169–171° C.

(D) A solution of 4.47 g. of 2-carboxamido-4-[2-(3,4-dimethoxyphenyl)ethyl]morpholin-5-one in 5.2 ml. of freshly distilled phosphorus oxychloride and 122 ml. of 1,2-dichloroethane is heated at reflux under anhydrous conditions for 2 hours. The solvent is then removed in vacuo at 80° C. and the residue dried over potassium hydroxide in vacuo at room temperature for 18 hours, dissolved in 85 ml. of methanol and diluted with 9.4 ml. of water. This solution is cooled and treated portionwise with 2.44 g. of sodium borohydride. After removing the solvents in vacuo, the residue is treated with 30 ml. of 2.5 N aqueous hydrochloric acid. This solution is washed with ether, rendered basic with 4 N sodium hydroxide and extracted three times with 20 ml. portions of methylene chloride. The combined methylene chloride extracts are dried over magnesium sulfate, filtered and evaporated to dryness to yield 3-cyano-9,10-dimethoxy-1,3,4,6,7,11b-hexahydro-[1,4]oxazino[3,4a]isoquinoline which is further purified through recrystallization from absolute ethanol with charcoal clarification as necessary, M.P. 182–184° C. (isomer I). Treatment of an ethereal solution of this compound with hydrogen chloride yields the corresponding hydrochloride salt.

Concentration of the mother liquors yields isomer II of 3-cyano-9,10-dimethoxy-1,3,4,6,7,11b-hexahydro-[1,4]isoquinoline, M.P. 175–177° C. This isomer is also obtained from isomer II of 3-carboxamido-9,10-dimethoxy-1,3,4,6,7,11b - hexahydro-[1,4]oxazino[3,4a]isoquinoline, M.P. 237.5–240.5, described hereafter, through dehydration with phosphorus oxychloride in refluxing 1,2-dichloroethane.

The product of the phosphorus oxychloride cyclization in the principal procedure of part D of this example can also be reduced with 10% palladium on charcoal to yield the identical product.

EXAMPLE 2

3-cyano-9,10-methylenedioxy-1,3,4,6,7,11b-hexahydro-[1,4]oxazino[3,4a]isoquinoline (A) A solution of 49.2 g. of 2-(3,4-methylenedioxyphenyl)ethylamine hydrochloride M.P. 210–212° in 1.25 liters of water is treated with 10% aqueous sodium carbonate until the pH is 9–10 (test paper). The mixture is extracted three times with 500 ml. portions of methylene chloride and the combined extracts are dried over magnesium sulfate, filtered and evaporated in vacuo at 90° C. to yield the free amine as a pale red gum. A solution of the free amine in 25 ml. of 1,2-dimethoxyethane is stirred with 96 ml. of a 2.56 M solution of glycidamide in 1,2-dimethoxyethane with cooling in a cold-water bath for one hour and then allowed to stand in the bath for an additional 18 hours. Acetone is added to yield a slurry of crystalline material which is collected by filtration and recrystallized twice from isopropanol to yield 2-hydroxy-3 - [2 - (3,4-methylenedioxyphenyl)ethyl]propionamide, M.P. 141–140° C.

(B) To a solution of 26.2 g. of the above propionamide in 500 ml. of dimethylformamide are added 11 g. of anhydrous sodium acetate. This mixture is stirred with cooling in an ice-water bath and a solution of 8 ml. of chloroacetyl chloride in 80 ml. of dimethylformamide is added over a two hour period, maintaining a temperature of 10° C. The reaction mixture is stirred with cooling for an additional hour and then allowed to stand overnight at room temperature. The reaction mixture is next poured into 600 ml. of water, maintaining the temperature below 25° C. and this mixture is then extracted three times with 100 ml. portions of methylene chloride. The combined extracts are dried over magnesium sulfate, filtered and evaporated in vacuo at 80° C. to yield an oil.

To a solution of this oil in 200 ml. of isopropanol, cooled in an ice-water bath, are added dropwise and with stirring, 12 ml. of 50% aqueous sodium hydroxide. The mixture is stirred for an additional one hour and the white precipitate is collected by filtration and suspended in 200 ml. of water for 18 hours. The remaining solid is collected by filtration and dried in vacuo at 50° C. to yield 2-carboxamido - 4 - [2-(3,4-methylenedioxyphenyl)ethyl]morpholin-5-one which upon recrystallization from ethanol demonstrates a melting point of 236–237° C.

(C) A mixture of 4 g. of 2-carboxamido-4-[2-(3,4-methylenedioxyphenyl)ethyl]morpholin - 5-one, 6.3 ml. of phosphorus oxychloride and 40 ml. of 1,2-dichloroethane is heated at reflux for two hours (bath temperature 90°, "Drierite" guard tube) and 45 ml. of methanol in vacuo at 100° C. The residue is dissolved in 45 ml. of methanol and 2 ml. of 50% aqueous sodium hydroxide are added. The solution is still acidic. There is next added portionwise, with stirring and cooling in an ice-water bath, 1.67 g. of sodium borohydride. After stirring overnight, the finely-divided pink solid is collected by filtration, and suspended in 50 ml. of water. This suspension is extracted three times with 150 ml. portions of methylene chloride and the combined extracts are dried over magnesium sulfate, filtered and evaporated in vacuo at 100° C. to yield crude 3 - cyano-9,10-methylenedioxy-1,3,4,6,7,11b - hexahydro - [1,4]oxazino[3,4a]isoquinoline. The aqueous methanolic filtrate is evaporated to dryness in vacuo at 90° C. and the residue is treated with 30 ml. of saturated aqueous sodium hydrogen carbonate. This mixture is in turn extracted four times with 20 ml. portions of methylene chloride. The combined extracts are dried over magnesium sulfate, filtered and evaporated in vacuo at 90° C. to yield a semi-crystalline gum. Trituration of this material with 2B ethanol and filtration yields additional crude nitrile.

The two samples are combined and recrystallized from 2B ethanol to yield a mixture of the two isomers of 3-cyano-9,10 - methylenedioxy-1,3,4,6,7,11b - hexahydro-[1,4]oxazino[3,4a]isoquinoline, M.P. 168–183° C. Pure isomer I, M.P. 190–192° C. can be obtained from this mixture of isomers by fractional crystallization from ethyl acetate.

In a similar fashion, employing 2-(3,4,5-trimethoxyphenylethylamine in the foregoing procedure there are sequentially obtained 2-hydroxy-3-[2-(3,4,5 - trimethoxyphenyl)ethyl]-propionamide, M.P. 136–137° C. (isopropanol); 2 - carboxamido-4-[2 - (3,4,5-trimethoxyphenyl)-ethyl]morpholin-5-one, M.P. 204.5–206° C. (isopropanol); and 3 - cyano-9,10,11-trimethoxy-1,3,4,6,7,11b-hexahydro - [1,4]oxazino[3,4a]isoquinoline (isomer II) M.P. 151–152° C. (ethanol).

EXAMPLE 3

3-(N,N-diethylcarboxamido)-9,10-dimethoxy-1,3,4,6,7,11b-hexahydro-[1,4]oxazino[3,4a]isoquinoline (A) A mixture of 2.17 g. of 3-cyano-9,10-dimethoxy-1,3,4,6,7,11b - hexahydro - [1,4]oxazino[3,4a]isoquinoline, 32.2 ml. of 0.5 N ethanolic potassium hydroxide and 8.06 ml. of water is heated at reflux for 48 hours. At the end of this time, the mixture is evaporated in vacuo at 80° C. and the residue is treated with 25 ml. of benzene and re-evaporated. This procedure is repeated with an additional 25 ml. of benzene and the residue, comprising 9,10-dimethoxy - 1,3,4,6,7,11b - hexahydro-[1,4]oxazino[3,4a]isoquinoline - 3 - carboxylic acid, is dried in vacuo over phosphorus pentoxide for 96 hours.

Alternatively, 10.0 g. of 3-cyano-9,10-dimethoxy-1,3,4,6,7,11b - hexahydro - [1,4]oxazino[1,4a]isoquinoline (a mixture of isomers I and II) are suspended in 75 ml. of 1 N aqueous sodium hydroxide and 110 ml. of water. This suspension is heated at reflux with a soda-lime guard tube for two hours, after which time a clear solution is obtained. The water is removed in vacuo at 80° C. to yield a pale brown gum which is treated with 50 ml. of 2.5 N aqueous hydrochloric acid to give a clear solution. Upon scratching, crystallization begins. After standing at room temperature for 18 hours the mixture is filtered and the crystals thus collected are washed with additional 2.5 N acid (a total of 20 ml). After drying in vacuo for 18 hours at 50° C., off-white crystals of the carboxylic acid hydrochloride (isomers I and II), M.P. 200–205° (dec.) are obtained.

(B) The material obtained according to the first procedure of Part A of this example is dissolved in 25 ml. of dry benzene and 5.83 ml. of redistilled oxalyl chloride are added. This mixture is stirred at room temperature for 48 hours and then at reflux for two hours. The solvents are removed by evaporation in vacuo at 85° C. and the residual acid chloride is dissolved in 25 ml. of dry benzene and 6.5 ml. of diethylamine are added. This mixture is allowed to stand at room temperature for 30 minutes, and then treated with 25 ml. of water and extracted three times with 25 ml. of chloroform. The combined extracts are dried over magnesium sulfate, filtered and evaporated in vacuo to yield 3-(N,N-diethylcarboxamido)-9,10-dimethoxy - 1,3,4,6,7,11b - hexahydro-[1,4]-oxazino[3,4a]isoquinoline, M.P. 121–124° C. which is further purified through recrystallization from ethyl acetate. The hydrochloride salt as the partial hydrate melts at 205–210° C. Further recrystallization from isopropanol raises the melting point to 230–231° C.

Alternatively, in an atmosphere of nitrogen and with stirring, there are added at room temperature, 45 ml. of oxalyl chloride to a suspension of 38.5 g. of 9,10-dimethoxy-1,3,4,6,7,11b - hexahydro - [1,4]oxazino[3,4a]isoquinoline-3-carboxylic acid hydrochloride (prepared according to the alternative procedure of Part A of this example) in 75 ml. of benzene. This mixture is stirred for 30 minutes, then heated at reflux for two hours and finally evaporated to dryness in vacuo. Seventy-five milliliters of benzene are added to the residue and evaporation is repeated. The residue, consisting essentially of the oxazinoisoquinoline 3-carboxylic acid chloride hydrochloride, is suspended in 100 ml. of methylene dichloride and to the stirred suspension there are added dropwise 23 g. of diethylamine, the temperature of the reaction mixture being maintained at 25° C. by external cooling. Upon completion of the addition, the reaction mixture is allowed to stand at room temperature overnight. After addition of 75 ml. of water, the organic layer is separated, washed with 75 ml. of water, dried over magnesium sulfate, treated with charcoal, filtered, and evaporated to dryness. The residual solid is crystallized from ethyl acetate-hexane to yield 3 - (N,N-diethylcarboxamido)-9,10-dimethoxy - 1,3,4,6,7,11b - hexahydro[1,4]oxazino-[3,4a]isoquinoline (isomer II), M.P. 121–124° C.

The acid chloride hydrochloride can also be obtained via utilization of the appropriate quantity of thionyl chloride in place of oxalyl chloride.

In a similar fashion by substituting 3-cyano-9,10-methylenedioxy-1,3,4,6,7,11b-hexahydro-[1,4]oxazino[3,4]isoquinoline and 3-cyano-9,10,11-trimethoxy-1,3,4,6,7,11b- hexahydro-[1,4]oxazino[3,4a]isoquinoline in the procedure of this example, there are respectively obtained 3-(N,N-diethylcarboxamido)-9,10-methylenedioxy-1,3,4,6,7,11b - hexahydro - [1,4]oxazino[3,4a]isoquinoline, M.P. 117–118.5° C. (isopropanol) and 3-(N,N-diethylcarboxamido)-9,10,11-trimethoxy-1,3,4,6,7,11b -hexahydro-[1,4]oxazino[3,4a]isoquinoline (isomer II) M.P. 91–93° C. (isopropanol).

EXAMPLE 4

3-carboxamido-9,10-dimethoxy-1,3,4,6,7,11b-hexahydro-[1,4]oxazino[3,4a]isoquinoline A mixture of .595 g. of 3-cyano-9,10-dimethoxy-1,3,4,6,7,11b-hexahydro-[1,4]oxazino[3,4a]isoquinoline and 8.5 ml. of 0.511 N ethanolic potassium hydroxide is heated at reflux for 2 hours. The solvent is removed in vacuo at 75° C. and the residue treated with 50 ml. of water and extracted three times with 50 ml. portions of chloroform. The combined extracts are dried over magnesium sulfate and evaporated to yield 3-carboxamido-9,10-dimethoxyl-1,3,4,6,7,11b - hexahydro - [1,4]oxazino [3,4a] isoquinoline (isomer II), M.P. 215–216° C. which can be recrystallized from absolute ethanol, thereby raising the melting point to 237.5–240.5° C. (dec.).

Alternatively 3-cyano - 1,3,4,6,7,11b-hexahydro - [1,4] oxazino[3,4a]isoquinoline derivatives may be hydrolysed according to the following procedure:

A mixture of 3.7 g. of 3-cyano-9,10,11-trimethoxy-1,3,4,6,7,11b-hexahydro-[1,4]oxazino[3,4a]isoquinoline, 25 ml. of 0.511 N potassium t-butoxide-t-butanol and 370 ml. of a-butanol is heated at reflux for two hours (120° bath temperature; sodaline guard tube) and the solvent is then removed in vacuo at 90° C. The residue is treated with 1 N aqueous hydrochloric acid to a pH of 1–2 (test paper), then neutralized with saturated aqueous sodium hydrogen carbonate to yield a pink solution containing some crystalline material. The mixture is extracted four times with 20 ml. portions of methylene chloride and the combined extracts are dried over magnesium sulfate, filtered and evaporated in vacuo at 90° C. to yield the product, 3-carboxamido-9,10,11-trimethoxy-1,3,4,6,7,11b-hexahydro[1,4]oxazino-[3,4a]isoquinoline (isomer II) which is recrystallized from 2B ethanol, final M.P. 203.5–205° C.

Similarly from 3-cyano-9,10-methylenedioxy-1,3,4,6,7,11b-hexahydro-[1,4]oxazino[3,4a]isoquinoline there is obtained according to this procedure 3-carboxamido-9,10-methylenedioxy - 1,3,4,6,7,11b - hexahydro-[1,4]oxazino [3,4a]isoquinoline (isomer II) M.P. 226–228° C. (ethanol).

EXAMPLE 5

3-carboxamido-9,10-dimethoxy-1,3,4,6,7,11b-hexahydro-[1,4]oxazino[3,4a]isoquinoline (A) A solution of 6 g. of 3-cyano-9,10-dimethoxy-1,3,4,6,7,11b - hexahydro-[1,4]oxazino[3,4a]isoquinoline, 15 ml. of 95% ethanol and 14 g. of concentrated sulfuric acid is heated at reflux for 18 hours. The mixture is then diluted with 60 ml. of cold water, rendered basic with potassium carbonate and extracted with benzene: ether. The combined extracts are evaporated under reduced pressure to yield 3-carbethoxy-9,10-dimethoxy-1,3,4,6,7,11b-hexahydro-[1,4]oxazino[3,4a]isoquinoline (isomer I) as an oil.

The corresponding isomer II is obtained by heating at reflux 6.33 g. of 3-cyano-9,10-dimethoxy-1,3,4,6,7,11b-hexahydro-[1,4]oxazino[3,4a]isoquinoline (mixture of isomers I and II), 93 ml. of 0.5 N ethanolic potassium hydroxide and 21 ml. of water for four hours (100° bath temperature, soda-lime guard tube). The solvents are removed in vacuo at 80° C. and the residue is treated with methanolic hydrogen chloride to pH 1 (test paper). The inorganic precipitate is removed by filtration, and washed with methanol, the filtrate being evaporated in vacuo at 80° C. to yield a non-crystalline solid residue. Upon crystallization from hot 95% ethanol this residue yields the crystalline hydrochloride of 3-carbethoxy-9,10-dimethoxy-1,3,4,6,7,11b - hexahydro-[1,4]oxazino[3,4a]isoquinoline. This is dissolved in 60 ml. of water and added with stirring to 250 ml. of saturated aqueous sodium bicarbonate. After standing at room temperature for 30 minutes, the precipitate is collected by filtration and dried in vacuo at 50° C. to yield isomer II as colorless crystals which, after recrystallization from isopropanol, melts at 111.5–113.5° C.

Use of other (lower) alkanols such as methanol, propanol, isopropanol and the like under similar conditions yields the corresponding (lower)alkyl ester intermediate. Thus for example, a suspension of 5.0 g. of 3-cyano-9,10-dimethoxy-1,3,4,6,7,11b - hexahydro - [1,4]oxazino[3,4a]isoquinoline, M.P. 182–4° C., in 83 ml. of methanol and 2 ml. of water is stirred and cooled in an ice-water bath. Hydrogen chloride gas is passed into the mixture for 30 minutes, and the solution thus obtained is stirred at room temperature for a further 90 minutes. The residue obtained after removal of the solvents in vacuo at 100° C. is treated with 100 ml. of saturated aqueous sodium hydrogen carbonate and this mixture extracted three times with 100 ml. portions of chloroform. The combined extracts are dried over magnesium sulfate and evaporated in vacuo at 100°. Trituration of the residue with ether yields 3-carbomethoxy - 9,10 - dimethoxy - 1,3,4,6,7,11b-hexahydro-[1,4]oxazino[3,4a]isoquinoline (isomer I), M.P. 108–109° C., after recrystallization from isopropanol. The corresponding isomer II, M.P. 123–124.5° C. of 3-carbomethoxy-9,10-dimethoxy-1,3,4,6,7,11b-hexahydro-[1,4]oxazino[3,4a]isoquinoline is obtained upon subjecting 3-cyano-9,10-dimethoxy-1,3,4,6,7,11b-hexahydro-[1,4]oxazino[3,4a]isoquinoline, M.P. 206–212° to this procedure.

(B) Three grams of 3-carbethoxy-9,10-dimethoxy-1,3,4,6,7,11b-hexahydro-[1,4]oxazino[3,4a]isoquinoline (isomer I) dissolved in 15 ml. of ethanol and 30 ml. of ammonium hydroxide are mixed with shaking and allowed to stand 96 hours. The mixture is then evaporated and the residue triturated with benzene to yield 3-carboxamido-1,3,4,6,7,11b-hexahydro-[1,4]oxazino[3,4a]isoquinoline (isomer I) which may be recrystallized from absolute ethanol, M.P. 215–216° C.

The identical product is obtained from 3-carbomethoxy-9,10-dimethoxy-1,3,4,6,7,11b-hexahydro-[1,4]oxazino[3,4a]isoquinoline, M.P. 108–109° C.

The corresponding isomer II is obtained in an analogous fashion. Thus 5 g. of 3-carbethoxy-9,10-dimethoxy-1,3,4,6,7,11b - hexahydro-[1,4]oxazino[3,4a]isoquinoline hydrochloride (isomer II), M.P. 111.5–113.5° C., are added to 150 ml. of concentrated aqueous ammonia. The suspension is stirred at room temperature for 18 hours. The insoluble material which forms is collected by filtration and dried in a vacuum desiccator over phosphorus pentoxide for two days to yield 3-carboxamido-9,10-dimethoxy-1,3,4,6,7,11b - hexahydro - [1,4]oxazino[3,4a]isoquinoline (isomer II) as colorless crystals, which after being recrystallized three times from ethanol melts at 236.5–240.5° C.

EXAMPLE 6

3-(N-ethylcarboxamido)-9,10-dimethoxy-1,3,4,6,7,11b-hexahydro-[1,4]oxazino[3,4a]isoquinoline One milliliter of 70% aqueous ethylamine and 24.4 mg. of 3 - carbomethoxy-9,10-dimethoxy-1,3,4,6,7,11b-hexahydro - [1,4]oxazino[3,4a]isoquinoline (isomer II) are stirred until dissolution occurs (about 5 minutes) and then allowed to stand at room temperature for 18 hours. The mixture is then evaporated in vacuo at 100° C. to yield a solid residue which is dissolved in 5 ml. of chloroform. This solution is dried over magnesium sulfate, filtered and evaporated in vacuo at 100° C. to yield crystalline 3 - (N - ethylcarboxamido-9,10-dimethoxy-1,3,4,6,7,11b - hexahydro - [1,4]oxazino[3,4a]isoquinoline (isomer II), M.P. 153–154° C.

EXAMPLE 7

3-piperidinocarbonyl-9,10-dimethoxy-1,3,4,6,7,11b-hexahydro-[1,4]oxazino[3,4a]isoquinoline Five grams of 9,10 - dimethoxy-1,3,4,6,7,11b-hexahydro - [1,4]oxazino[3,4a]isoquinoline - 3 - carboxylic acid hydrochloride, M.P. 206–212° C., and 5 ml. of thionyl chloride in 100 ml. of 1,2-dichloroethane are heated at reflux ("Drierite" guard tube) for one hour. The solvent and excess thionyl chloride are removed in vacuo at 40° C. to yield a solid residue, consisting of 9,10 - dimethoxy-1,3,4,6,7,11b - hexahydro[1,4]oxazino[3,4a]isoquinoline-3-carboxylic acid chloride hydrochloride. This material is suspended in 100 ml. of methylene chloride treated with 5 ml. of piperidine, added portionwise with stirring and cooling in a cold-water bath. After stirring an additional five minutes, the mixture is evaporated in vacuo at 40° C. to yield a pale brown crystalline residue. This is treated with 50 ml. of saturated aqueous sodium bicarbonate and extracted with methylene chloride (1× 100 ml.; 2× 50 ml.). The combined extracts were dried over magnesium sulfate, filtered and evaporated in vacuo at 80° C. to afford a crystalline residue. Two recrystallizations from ethyl acetate yields 3-piperidinocarbonyl-9,10-dimethoxy-1,3,4,6,7,11b - hexahydro - [1,4]oxazino[3,4a]isoquinoline (isomer II), M.P. 200–201.5° C.

In a similar fashion utilizing 3 ml. of morpholine, 5 ml. of pyrrolidine, 5 ml. of 1-methylpriperazine and excess N-(hydroxyethyl)piperazine in place of piperidine in this example, there are respectively obtained 3-morpholinocarbonyl - 9,10 - dimethoxy - 1,3,4,6,7,11b-hexahydro - [1,4]oxazino[3,4a]isoquinoline, M.P. 233–235° C. isopropanol); 3 - pyrrolidinocarbonyl - 9,10-dimethoxy-1,3,4,6,7,11b - hexahydro - [1,4]oxazino[3,4a]isoquinoline, M.P. 233–235° C. (isopropanol); 3 - (N' - methylpiperazinocarbonyl) - 9,10 - dimethoxy - 1,3,4,6,7,11b-hexahydro - [1,4]oxazino[3,4a]isoquinoline, M.P. 155–157° C. (ethyl acetate); and 3 - [N'-(2-hydroxyethyl)-piperazinocarbonyl] - 9,10-dimethoxy-1,3,4,6,7,11b-hexahydro - [1,4]oxazino[3,4a]isoquinoline, M.P. of the dioxane solvate; 76–78° C. (dioxane).

Likewise with excess 1 - benzyloxycarbonylpiperazine there is obtained 3 - (N'-benzyloxycarbonylpiperazinocarbonyl - 9,10 - dimethoxy - 1,3,4,6,7,11b-hexahydro-[1,4]oxazino[3,4a]isoquinoline, which after treatment with hydrogen bromide in glacial acetic acid yields 3-piperazinocarbonyl - 9,10 - dimethoxy - 1,3,4,6,7,11b- hexahydro - [1,4]oxazino[3,4a]isoquinoline, M.P. 213–214° C. (methylene chloride-ether).

EXAMPLE 8

3-(N,N-diethylcarboxamido-9,10-dimethoxy-1,3,4,6,7,11b-hexahydro-[1,4]oxazino[3,4a]isoquinoline A suspension of 135.1 mg. of 9,10-dimethoxy-1,3,4,6,7,11b - hexahydro - [1,4]oxazino[3,4a]isoquinoline-3-carboxylic acid hydrochloride (isomer II) in 2.5 ml. of methylene chloride is treated with 0.115 ml. of triethylamine. The solution which results is stirred with cooling in an ice-water bath, and 64.2 mg. of isobutyl chloroformate in 1.5 ml. of diethylamine is added and the mixture is stirred for an additional 15 minutes in the cooling bath and for 15 hours at room temperature. The solution is then shaken with 5 ml. of saturated aqueous sodium hydrogen carbonate. The methylene chloride layer is separated and the aqueous layer is washed twice with 5 ml. portions of methylene chloride. The combined methylene chloride extracts are dried over magnesium sulfate, filtered, and evaporated in vacuo at 100° C. to yield a pale green gum. This is crystallized from ether to yield 3 - (N,N-diethylcarboxamido)-9,10-dimethoxy-1,3,4,6,7,11b - hexahydro - [1,4]oxazino[3,4a]isoquinoline (isomer II), M.P. 121–123° C.

EXAMPLE 9

3-(N,N-diethylcarboxamido-9,10-dimethoxy-1,3,4,6,7,11b-hexahydro-[1,4]oxazino[3,4a]isoquinoline To 10 ml. of diethylamine stirred under nitrogen are added with cooling in an ice-water bath, 22.9% by weight butyllithium in 1 ml. of hexane. One milliliter of this solution is added to 48.6 mg. of 3 - carbomethoxy-9,10-dimethoxy - 1,3,4,6,7,11b - hexahydro[1,4]oxazino[3,4a] isoquinoline (isomer II) and this mixture is stirred for 24 hours at room temperature. The excess amine is then removed by evaporation in vacuo at 100° C. and the residue is treated first with 1 ml. of 1 N aqueous hydrochloric acid and then with 5 ml. of saturated aqueous sodium hydrogen carbonate. This mixture is extracted three times with 5 ml. portions of methylene chloride and the combined extracts are dried over magnesium sulfate, filtered and evaporated in vacuo at 100° C. to yield 3-(N,N-diethylcarboxamido) - 9,10 - dimethoxy - 1,3,4,6,7,11b-hexahydro - [1,4]oxazino[3,4a]isoquinoline (isomer II) containing some starting material. The two components are separated by chromatography to yield the pure amide, M.P. 122–124° C.

EXAMPLE 10

3-(N,N-diethylcarboxamido-9,10-dimethoxy-1,3,4,6,7,11b-hexahydro-[1,4]oxazino[3,4a]isoquinoline A mixture of 287.9 mg. of 9,10-dimethoxy-1,3,4,6,7,11b - hexahydro - [1,4]oxazino[3,4a]isoquinoline-3-carboxylic acid hydrochloride (isomer II), 0.27 ml. of triethyl amine and 2 ml. of chloroacetonitrile is heated at reflux (100° C. bath temperature, soda-lime guard tube) for one hour. The solution is then allowed to stand at room temperature for 17 hours, after which time some crystalline precipitate forms. After evaporation to dryness in vacuo at 100° C., the residue is treated with 5 ml. of satuated aqueous sodium hydrogen carbonate and this mixture is extracted three times with 5 ml. of methylene chloride. The combined extracts are dried over magnesium sulfate, filtered and evaporated in vacuo at 100° C. to yield a yellow gum. This is treated with 2 ml. of diethylamine, and heated at reflux (100° C. bath temperature, soda-lime guard tube) for 19 hours. The excess diethylamine is removed by distillation in vacuo at 100° C. to yield a brown gum which crystallizes upon trituration with ether. Recrystallization from ethyl acetate-hexane yields 3 - (N,N - diethylcarboxamido)-9,10-dimethoxy-1,3,4,6,7,11b - hexahydro - [1,4]oxazino[3,4a]isoquinoline (isomer II), M.P. 119–122° C.

EXAMPLE 11

3-(N,N-diethylcarboxamido)-9,10-dimethoxy-1,3,4,6,7,11b-hexahydro-[1,4]oxazino[3,4a]isoquinoline A solution of 501.7 mg. of 9,10-dimethoxy-1,3,4,6,7,11b - hexahydro-[1,4]oxazino[3,4a]isoquinoline - 3 - carboxylic acid hydrochloride (isomer II) in 5 ml. of triethylamine is prepared by warming the components. After cooling the solution to room temperature (some material crystallizes out), 396.1 mg. of p-nitrophenol trifluoroacetate are added and this mixture is stirred at room temperature for two hours. The excess triethylamine is removed in vacuo at 50° C. and the residue is treated with 10 ml. of saturated aqueous sodium hydrogen carbonate. Extraction of this solution with methylene chloride (1× 10 ml., 2× 5 ml.), followed by drying over magnesium sulfate, filtration and evaporation in vacuo at 50° C. of the extracts yields a pale brown gum. Five milliliters of diethylamine are added to this gum and this mixture is heated at reflux for five hours and then allowed to stand at room temperature for 18 hours. Evaporation yields a brown gum which is treated with 10 ml. of 2.5 N aqueous sodium hydroxide and extracted three times with 10 ml. of methylene chloride. The combined extracts are dried over magnesium sulfate, filtered and evaporated in vacuo at 100° C. to yield a brown gum which crystallizes upon trituration with ether to yield the product, M.P. 120–123° C.

EXAMPLE 12

3-(N,N-diethylcarboxamido)-9,10-dimethoxy-1,3,4,6,7,11b-hexahydro-[1,4]oxazino[3,4a]isoquinoline (A) A mixture of 240 ml. of trifluoroacetic anhydride, 40 ml. of 90% aqueous hydrogen peroxide and 240 ml. of methylene chloride is stirred for 30 minutes, maintaining the temperature below 15° C. Six hundred and forty grams of disodium hydrogen phosphate are then added, followed by a solution of 82.1 g. of N,N-diethylacrylamide in 870 ml. of methylene chloride, the latter added over a 45 minute period, with continued stirring and cooling in an ice-water bath (temperature about 30°). After stirring for an additional 2½ hours, the mixture is heated at reflux for one hour and then cooled. One liter of water is added and the organic layer is separated and washed three times with 100 ml. portions of saturated aqueous sodium hydrogen carbonate. The methylene chloride extracts are dried over magnesium sulfate, filtered and evaporated in vacuo at 50° C., to yield a residual oil. Titration (as for glycidamide in Example 1) indicates an epoxide content of 4.5 mMole/g. The product, N,N-diethylglycidamide, is used in the next step without further purification.

(B) The above epoxide (86.9 g.) is added over 30 minutes to a stirred, refluxing solution of 78 g. of 2-(3,4-dimethoxyphenyl)ethylamine in 220 ml. of 1,2-dimethoxyethane. Refluxing is continued for three hours, after which time the solvent is removed in vacuo at 100° C. The residue is treated with 300 ml. of water and rendered acidic by the addition of 50 ml. of concentrated aqueous hydrochloric acid. The acidic mixture is washed four times with 150 ml. portions of methylene chloride and the washed aqueous layer is then rendered basic by the addition of 150 ml. of 5 N aqueous sodium hydroxide, and extracted three times with 250 ml. portions of methylene chloride. The combined extracts are dried over magnesium sulfate, filtered and evaporated in vacuo at 100° C. to yield N,N-diethyl 2-hydroxy-3-[2-(3,4-dimethoxyphenyl)ethylamino]propionamide as an oil, B.P. 193–196° C./0.1 mm. A 1.35 g. portion of this amide is dissolved in 20 ml. of ether and hydrogen chloride gas is bubbled through the solution. The ether is decanted and the residual gum triturated with ether and a small amount of acetone until crystallization occurs. Two recrystallizations from acetone yield the pure hydrochloride of the above amide, M.P. 131–133° C.

15

(C) A 50% sodium hydride-mineral oil dispersion (8.1 g.) is washed three times by decantation with hexane and then suspended in 250 ml. of dry benzene. A solution of 17.3 g. of N,N-diethyl 2-hydroxy-3-[2-(3,4-dimethoxyphenyl)ethylamino]-propionamide (free base) in 100 ml. of benzene is added and the mixture is heated at reflux ("Drierite" guard tube) for one hour, after which time hydrogen evolution ceases. After cooling the mixture to room temperature, the almost clear solution is decanted from the excess sodium hydride, using 10 ml. of benzene to wash the precipitate. The combined decanted solution and benzene washing are stirred with cooling in an ice-water bath, and a solution of 6.0 ml. of ethyl chloroacetate in 25 ml. of benzene is added over a 20 minute period. After stirring in the cooling bath for an additional 45 minutes, the mixture is heated at reflux for 18 hours, cooled, washed with 100 ml. of 1 N aqueous hydrochloric acid and 100 ml. of saturated aqueous sodium hydrogen carbonate, dried over magnesium sulfate, filtered and finally evaporated in vacuo at 100° C. to give a pale yellow oil. Trituration with ether and filtration affords 2 - (N,N - diethylcarboxamido) - 4 - [2 - (3,4-dimethoxyphenyl)ethyl]morpholin - 5 - one as colorless crystals, M.P. 85–86° C. after recrystallization from ethyl acetate-hexane.

(D) A mixture of 381.4 mg. of 2-(N,N-diethylcarboxamido) - 4 - [2 - 3,4 - dimethoxyphenyl)ethyl]morpholin-5-one, 0.5 ml. of phosphorus oxychloride and 6.5 ml. of 1,2-dichloroethane is heated at reflux (bath temperature 110° C.; "Drierite" guard tube) for two hours. The reaction mixture is then evaporated in vacuo at 100° C. to yield a red gum which is dried in a vacuum desiccator over phosphorus pentoxide and potassium hydroxide for three hours. The gum is then dissolved in 9 ml. of methanol and treated with 2.5 N aqueous sodium hydroxide to a pH of about 5 (test paper). This solution is cooled in an ice-water bath and treated portionwise with stirring with 131.8 mg. of sodium borohydride. This solution is stirred for an additional 30 minutes in the cooling bath and the solvent is then evaporated in vacuo at 100° C. The residue is treated with 10 ml. saturated aqueous sodium hydrogen carbonate and extracted three times with 10 ml. portions of methylene chloride. The combined extracts are dried over magnesium sulfate, filtered and evaporated in vacuo at 100° C. to yield a residue consisting of 3-(N,N-diethylcarboxamido)-9,10-dimethoxy-1,3,4,6,7,11b - hexahydro - [1,4]oxazino[3,4a]-isoquinoline (mixed isomers I and II) as demonstrated by comparative thin layer chromatography and infrared spectroscopy against authentic reference samples.

EXAMPLE 13

A solution of 6.95 g. of 3-(N,N-diethylcarboxamido)-9,10 - dimethoxy - 1,3,4,6,7,11b - hexahydro - [1,4]oxazino[3,4]-isoquinoline in hot methanol is treated with 2.4 g. of maleic acid dissolved in the same solvent. Concentration and cooling causes precipitation of the maleate salt which is collected by filtration.

Other salts such as the tartrate, succinate, citrate and the like are prepared in a similar manner.

EXAMPLE 14

Optical resolution of racemic 3-(N,N-diethylcarboxamido)9,10 - dimethoxy - 1,3,4,6,7,11b-hexahydro -[1,4]-oxazino[3,4a]isoqinoline A solution of 11.55 g. of racemic 3-(N,N-diethylcarboxamido)9,10 - dimethoxy - 1,3,4,6,7,11b-hexahydro-[1,4]oxazino-[3,4a]isoquinoline, M.P. 121–124° C., and 4.443 g. of (−)-malic acid in 50 ml. of isopropanol is prepared by heating the components together. This solution is allowed to stand at room temperature for 18 hours after which time the crystals are collected by filtration, washed with a little cold isopropanol and dried in vacuo at 40° C. The material so obtained is recrystallized from isopropanol to yield the (−)-malate of the (−)-base as colorless prisms, M.P. 91–96° C., $[\alpha]_D^{25}=$ −59.8° (c.=2.03 in methanol). The base regenerated from the mother liquors is enriched in the dextro-isomer.

The (−)-malate of the (−)-base is dissolved in 75 ml. of methylene chloride and shaken with 50 ml. of 10% aqueous sodium carbonate. The organic layer is separated and the aqueous layer is extracted twice with 25 ml. portions of methylene chloride. The combined organic extracts are dried over magnesium sulfate, filtered and evaporated in vacuo at 100° C. to yield colorless crystals, which on further recrystallization from isopropanol yields the free base, (−)-3-(N,N-diethylcarboxamido)-9-10-dimethoxy - 1,3,4,6,7,11b-hexahydro - [1,4]oxazino - [3,4] isoquinoline (isomer II), M.P. 133–135° C., $[\alpha]_D^{25}=$ −90.3° (c.=1.68 in methanol).

In an analogous manner, there is obtained from (+)-malic acid and the racemic base or the partially resolved base which is enriched in (+) isomer, the (+) malate of (+ - 3 - (N,N-diethylcarboxamido)-9,10-dimethoxy-1,3-,4,6,7,11b - hexahydro - [1,4]oxazino[3,4a]isoquinoline, double M.P. 87, 91–96° C., $[\alpha]_D^{25}=$ +58.6° (c.= 2.09 in methanol). The corresponding free base,(+)-3-(N,N - diethylcarboxamido)9,10 - dimethoxy-1,3,4,6,7,11b - hexahydro-[1,4]oxazino[3,4a]isoquinoline (isomer II), after crystallization from isopropanol, demonstrates a melting point of 132.5–134° C., $[\alpha]_D^{25}=$ +90.8° (c.=1.98 in methanol).

EXAMPLE 15

Ingredient: Quantity/capsule, mg.
3 - N,N - diethylcarboxamido)9,10-dimethoxy-1,3,4,6,7,11b - hexahydro - [1,4]oxazino[3,4a]isoquinoline _____ 100
Corn starch U.S.P. _____ 200

The foregoing ingredients are mixed and introduced into a two-piece No. 1 hard gelatin capsule. Pharmaceutically acceptable salts of the active ingredient, such as the hydrochloride, may alternatively be employed.

EXAMPLE 16

Ingredient: Quantity/tablet, mg.
3 - (N,N - diethylcarboxamido)-9,10-dimethoxy - 1,3,4,6,7,11b - hexahydro-[1,4]oxazino[3,4a]isoquinoline _____ 50
Corn starch U.S.P. _____ 130
Lactose _____ 160
Cab-o-Sil M–5 colloidal silica_____ 4
Gelatin U.S.P. _____ 5
Magnesium stearate U.S.P. _____ 1

The foregoing ingredients are thoroughly mixed and pressed into tablets suitable for oral administration of 50 mg. of active ingredient. The tablets may be scored to permit administration of fractional doses. Pharmaceutically acceptable salts of the active ingredient, such as the hydrochloride, may alternatively be employed.

What is claimed is:
1. A compound of the formula:

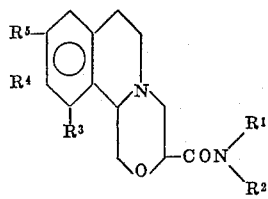

wherein each of $R^1$ and $R^2$ taken independently is hydrogen or (lower)alkyl or $R^1$ and $R^2$ taken together with the nitrogen atom to which they are attached are morpholino, piperidino, pyrrolidino, piperazino, N'-[(lower)alkyl] piperazino, N'-[hydroxy(lower)alkyl]piperazino, or N' [(lower)alkoxy(lower)-alkyl]piperazino; $R^3$ is hydrogen or (lower)alkoxy; and each of $R^4$ and $R^5$ taken independently is (lower) alkoxy or R⁴ and R⁵ taken together when R³ is hydrogen, are methylenedioxy.

2. A pharmaceutically acceptable acid addition salt of a compound according to claim 1.

3. A compound according to claim 1 wherein each of R¹ and R² is hydrogen or (lower)alkyl of from 1 to 3 carbon atoms or R¹ and R² taken together with the nitrogen atom to which they are attached are piperidino, morpholino, pyrrolidino, piperazino, N'-methylpiperazino or N'-2(hydroxyethyl)piperazino; R³ is hydrogen or methoxy; and each of R⁴ and R⁵ taken independently is methoxy or taken together when R³ is hydrogen are methylenedioxy.

4. A compound according to claim 3 wherein each of R¹ and R² is (lower)alkyl of from 1 to 3 carbon atoms.

5. The compound according to claim 1 which is 3-(N,N - diethylcarboxamido) - 9,10-dimethoxy-1,3,4,6,7,11b-hexahydro-[1,4]oxazino[3,4a]isoquinoline.

6. A pharmaceutically acceptable acid addition salt of the compound of claim 5.

7. The compound according to claim 5 which is trans 3 - (N,N - diethylcarboxamido)-9,10-dimethoxy-1,3,4,6,7,11b-hexahydro-[1,4]oxazino[3,4a]isoquinoline.

8. The pharmaceutically acceptable acid addition salts of the compound of claim 7.

9. The hydrochloride salt of the compound of claim 7.

10. The compound according to claim 1 which is 3-piperidinocarbonyl - 9,10 - dimethoxy - 1,3,4,6,7,11b-hexahydro-[1,4]oxazino[3,4a]isoquinoline.

11. The compound according to claim 1 which is 3-morpholinocarbonyl - 9,10 - dimethoxy - 1,3,4,6,7,11b-hexahydro-[1,4]oxazino[3,4a]isoquinoline.

12. The compound according to claim 1 which is 3-pyrrolidinocarbonyl - 9,10 - dimethoxy - 1,3,4,6,7,11b-hexahydro-[1,4]oxazino[3,4a]isoquinoline.

13. The compound according to claim 1 which is 3-(N'methylpiperazinocarbonyl)9,10 - dimethoxy - 1,3,4,6,7,11b-hexahydro-[1,4]oxazino[3,4a]isoquinoline.

14. The compound according to claim 1 which is 3-(N-ethylcarboxamido) - 9,10 - dimethoxy - 1,3,4,6,7,11b-hexahydro-[1,4]oxazino[3,4a]isoquinoline.

15. The compound according to claim 1 which is 3-piperazinocarbonyl - 9,10 - dimethoxy - 1,3,4,6,7,11b-hexahydro-[1,4]oxazino[3,4a]isoquinoline.

16. The compound according to claim 1 which is 3-[(N' - 2 - hydroxyethyl)piperazinocarbonyl]-9,10-dimethoxy - 1,3,4,6,7,11b - hexahydro-[1,4]oxazino[3,4a]isoquinoline.

17. The compound according to claim 1 which is 3-(N,N - diethylcarboxamido) - 9,10 - methylenedioxy-1,3,4,6,7,11b-hexahydro-[1,4]oxazino[3,4a]isoquinoline.

18. The compound according to claim 1 which is 3-(N,N - diethylcarboxamido) - 9,10,11-trimethoxy-1,3,4,6,7,11b-hexahydro-[1,4]oxazino[3,4a]isoquinoline.

19. The compound according to claim 1 which is 3-carboxamido - 9,10 - dimethoxy - 1,3,4,6,7,11b-hexahydro-[1,4]oxazino[3,4a]isoquinoline.

20. The compound according to claim 1 which is 3-carboxamido - 9,10,11 - trimethoxy - 1,3,4,6,7,11b-hexahydro[1,4]oxazino[3,4a]isoquinoline.

21. The claim according to claim 1 which is 3-carboxamido - 9,10 - methylenedioxy - 1,3,4,6,7,11b-hexahydro-[1,4]oxazino [3,4a]isoquinoline.

References Cited
UNITED STATES PATENTS

| | | |
|---|---|---|
| 2,286,390 | 6/1942 | Sparks. |
| 2,906,777 | 9/1959 | Denss et al. _____ 260—557 |
| 2,948,754 | 8/1960 | Litvan et al. _____ 260—247.7 |
| 3,051,710 | 8/1962 | Biel. |
| 3,052,680 | 9/1962 | Dupuy et al. _____ 260—247.7 |
| 3,244,701 | 4/1966 | Jurgens et al. |
| 3,246,975 | 4/1966 | Hopkins et al. _____ 260—247.7 |

OTHER REFERENCES

Kröhnke et al. Chemische Berichte vol. 97, p. 3566–76 (1964).

Noller, Chemistry of Organic Compounds, 2d ed., p. 244, Philadelphia, Saunders, 1957.

Schneider et al., Archiv. Der Pharmazie, vol. 294, pp. 645–54 (1961).

HENRY R. JILES, Primary Examiner

N. TROUSOF, Assistant Examiner

U.S. Cl. X.R.

424—248; 260—247.1, 247.2, 247.5, 247.7, 340.5, 348, 465, 559, 570.8

PO-1050
(5/69)

UNITED STATES PATENT OFFICE
CERTIFICATE OF CORRECTION

Patent No. 3,470,171  Dated Sept. 30, 1969

Inventor(s) Frank H. Clarke, Jr.

It is certified that error appears in the above-identified patent and that said Letters Patent are hereby corrected as shown below:

Col. 3, line 62: "atomcs" should be -- atoms --

Col. 4, line 62, in the formula "$R_S$" should be --$R^5$--

Col. 5, line 4: "cloro" should be -- chloro --

Col. 5, line 30: "Lewis aci p" should be -- Lewis acid --

Col. 6, line 1: "are previously defined" should be -- are as previously defined --

Col. 8, line 56: should read:--90°, "Drierite" guard tube) then evaporated in --

Col. 9, line 11: "phenylethylamine" should be --phenyl)ethylami:

Col. 10, line 45: "thoxyl" should be -- thoxy --

Col. 10, line 55: "a-butanol" should be -- t-butanol --

Col. 10, line 57: "sodaline" should be -- soda lime --

Col. 11, line 22: "methanolic" should be -- ethanolic --

Col. 12, line 55: "methylpriperazine" should be --methylpiper-

Col. 16, line 13: "[3,4]" should be -- [3,4a] --   azine --

Claim 1: A bond is omitted between the symbol "$R^4$" and the 10-position of the oxazinoisoquinoline ring.

SIGNED AND
SEALED
MAY 19 1970

(SEAL)
Attest:

Edward M. Fletcher, Jr.
Attesting Officer

WILLIAM E. SCHUYLER, JR.
Commissioner of Patents